(12) United States Patent
Buehler et al.

(10) Patent No.: US 6,481,513 B2
(45) Date of Patent: Nov. 19, 2002

(54) SINGLE ACTUATOR PER LEG ROBOTIC HEXAPOD

(75) Inventors: Martin Buehler, Ann Arbor, MI (US); Daniel E. Koditschek, Ann Arbor, MI (US); Uluc Saranli, Ann Arbor, MI (US)

(73) Assignees: McGill University, Montreal (CA); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 09/808,465

(22) Filed: Mar. 14, 2001

(65) Prior Publication Data

US 2001/0054518 A1 Dec. 27, 2001

Related U.S. Application Data

(60) Provisional application No. 60/189,735, filed on Mar. 16, 2000.

(51) Int. Cl.⁷ .............................................. B62D 57/02
(52) U.S. Cl. .......................................... 180/8.6; 901/1
(58) Field of Search .................. 180/8.1, 8.6; 446/353, 446/356, 377; 901/1

(56) References Cited

U.S. PATENT DOCUMENTS

| | | | |
|---|---|---|---|
| 1,351,752 A | 9/1920 | Honeywell | |
| 2,292,298 A | 8/1942 | Singer | |
| 2,827,735 A | 3/1958 | Grimm, Jr. | |
| 3,178,853 A | 4/1965 | Greenwood et al. | |
| 3,226,878 A | 1/1966 | Glass et al. | |
| 3,522,859 A | 8/1970 | Thring | |
| 3,845,831 A | 11/1974 | James | |
| 4,527,650 A | 7/1985 | Bartholet | |
| 4,629,440 A | 12/1986 | McKittrick, Jr. et al. | |
| 4,662,465 A | 5/1987 | Stewart | |
| 4,784,042 A | * 11/1988 | Paynter | 414/7 |
| 5,040,626 A | 8/1991 | Paynter | |
| 5,124,918 A | * 6/1992 | Beer et al. | 701/27 |
| 5,219,410 A | * 6/1993 | Garrec | 180/8.1 |
| 5,423,708 A | * 6/1995 | Allen | 180/8.6 |
| 5,484,031 A | 1/1996 | Koyachi et al. | |
| 5,644,204 A | 7/1997 | Nagle | |
| 5,929,585 A | 7/1999 | Fujita | |
| 6,238,264 B1 | * 5/2001 | Kazami et al. | 446/356 |

* cited by examiner

*Primary Examiner*—Kevin Hurley
(74) *Attorney, Agent, or Firm*—Harness, Dickey & Pierce, P.L.C.

(57) ABSTRACT

A mobile robot comprising a body and at least six compliant legs each having only one actuator. The compliant legs are mounted to the body for movement relative thereto in a single degree of freedom. A controller is operably coupled to the actuator of each compliant leg, the controller selectively actuates the actuators to drive the compliant legs in an alternating tripod gait.

19 Claims, 2 Drawing Sheets

SINGLE ACTUATOR PER LEG ROBOTIC HEXAPOD

STATEMENT OF GOVERNMENTAL SUPPORT

This invention was made with Government support under Grant No. N00014-98-1-0747 awarded by the Defense Advanced Research Projects Agency. The Government has certain rights in this invention.

FIELD OF THE INVENTION

The present invention generally relates to robotic devices and, more particularly, relates to a robotic device having six compliant legs, which is tadapted to accomplish a wide variety of dynamically dexterous tasks.

BACKGROUND OF THE INVENTION

Robotic devices are used for a wide variety of applications requiring mobility over varying terrains. These applications may include surveillance in dangerous environments, repair of equipment in restricted areas, exploration in new lands, or simply as entertainment. Accordingly, mobility over these terrains must include the ability to traverse broken or fractured ground, sand, gravel, and the like. Legged robots are believed to be particularly well suited for such high-obstacle applications.

In an attempt to provide a robotic device capable of reliably traversing such terrains, designers of legged robots have paid careful attention to providing efficient energy usage, a stable robotic platform, and reliable ground traction. In order to achieve this, it is often necessary to provide each leg with at least three actuated degrees of freedom. Still further additional actuated degrees of freedom are required in those designs that incorporate ankle/foot combinations. Each of these actuated degrees of freedom must be powered by a separate motorized actuator or complicated gearing system that is sufficiently sized to articulate each joint along the robotic leg.

However, employing such complex legs having multiple actuated degrees of freedom per leg in a robotic hexapod requires twelve, eighteen, or more actuators simply to power the robotic legs. Moreover, because of the large mass of current robotic hexapods, these actuators must be highly geared and, therefore, slow moving. It should be appreciated that robotic hexapods employing complex leg designs with at least three degrees of freedom are mechanically complex, relatively unreliable, and expensive.

Accordingly, there exists a need in the relevant art to provide a robotic device that provides energy efficient leg movement without the need for complex leg designs. Further, there exists a need in the relevant art to provide a robotic device that is lightweight and that minimizes the number of motorized actuators required. Still further, there exists a need in the relevant art to provide a robotic hexapod that overcomes the disadvantages of the prior art.

SUMMARY OF THE INVENTION

In view of the broad teachings of the present invention, a mobile robot having an advantageous construction is provided. The mobile robot includes a body and at least six compliant legs each having only one actuator. The compliant legs are mounted to the body for movement relative thereto in a single degree of freedom. A controller is operably coupled to the actuator of each compliant leg and drives the compliant legs in an alternating tripod gait.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
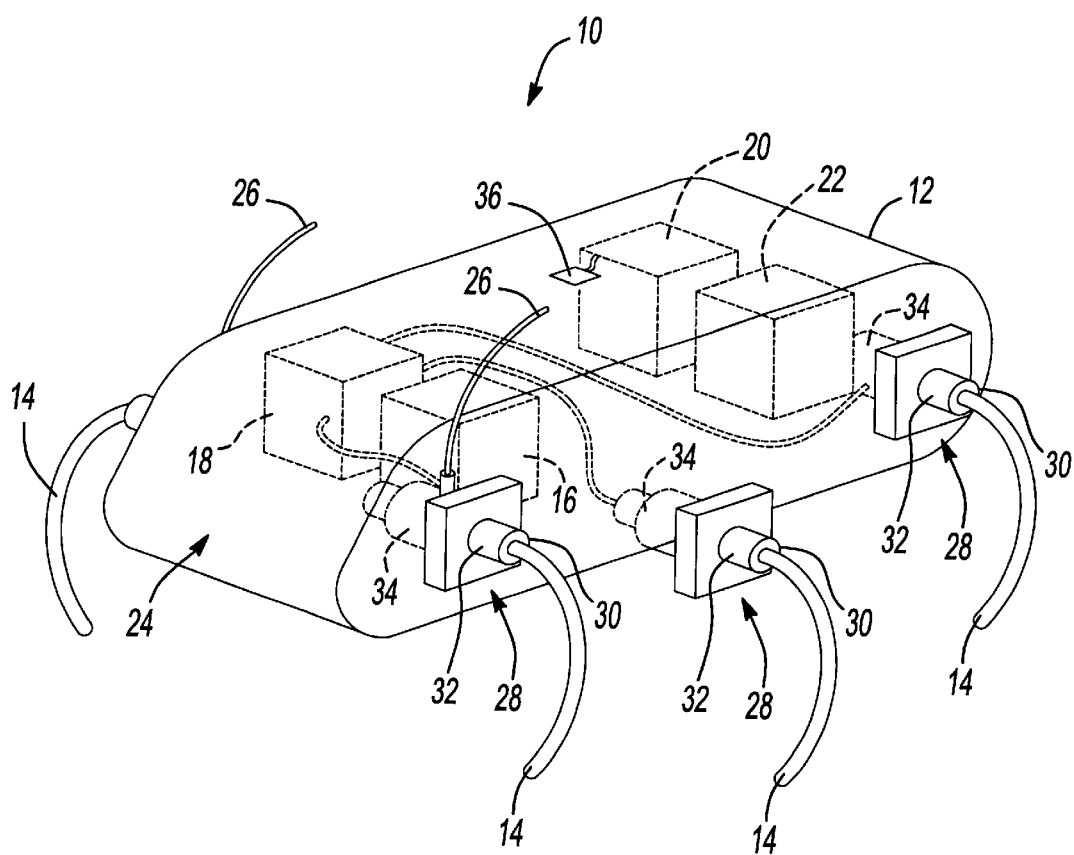
FIG. 1 is a perspective view, with portions hidden, illustrating the mobile robot of the present invention.
Figure 2:
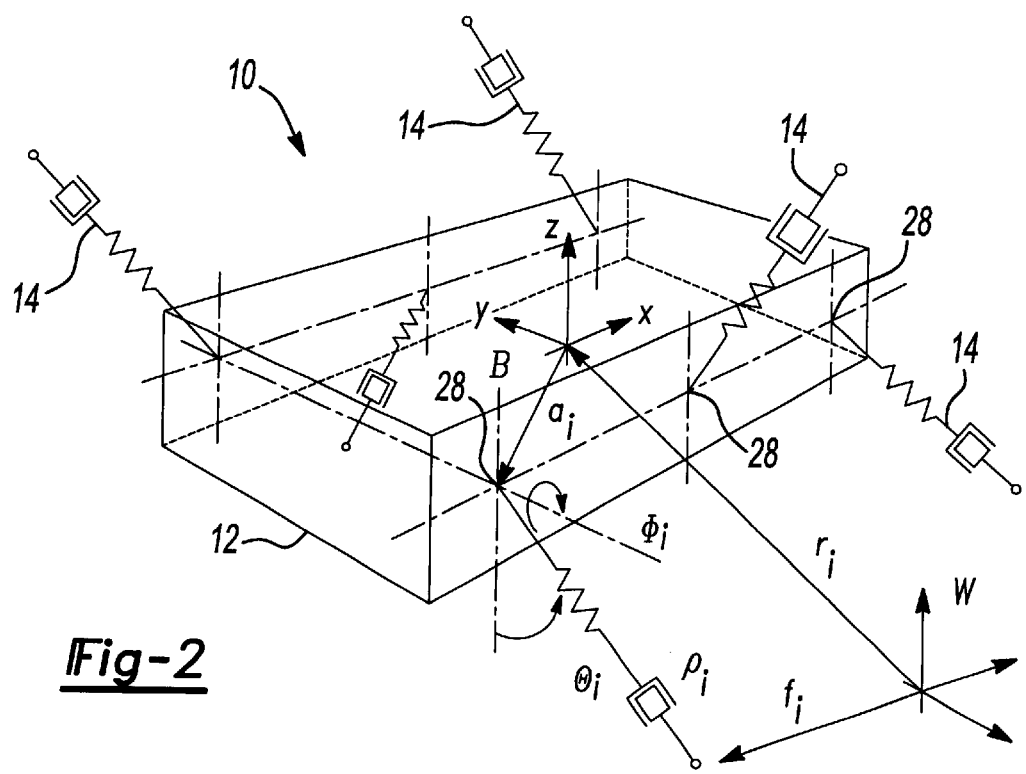
FIG. 2 is a schematic view illustrating the compliant legs of the mobile robot according to a first embodiment of the present invention.

Referring to FIGS. 1 and 2, a robotic device 10 is illustrated having a rigid body 12 and at least six compliant legs, each generally indicated at 14. As used herein, the term compliant leg generally refers to those legs whose shape changes as a result of reactant force being applied thereto. In the present application, this reactant force, at least in part, is the force that is generated by the weight of robotic device 10 acting upon the ground. As the shape of this compliant leg changes during locomotion, the forces that the leg exerts on the body also change in order to promote efficient exchange of energy. This is in contrast to a "rigid leg," which has a fixed shape and transfers all the reactant forces that it experiences directly to a robotic body. Such properties of compliant legs 14 are illustrated schematically in FIG. 2.

Robotic device 10 further includes all elements necessary for autonomous operation, including a computing system 16, an inpuVoutput system 18, a sensing system 20, an onboard power source 22, and a power drive system 24 associated with each compliant leg 14. Compliant legs 14 are mounted to power drive system 24 for rotational movement in a plane that is generally parallel to a longitudinal plane of rigid body 12, also known as a sagittal plane. Compliant legs 14 are arranged such that they are equally disposed on opposing sides of rigid body 12, thereby forming a left and right tripod pattern. Specifically, the left tripod includes the left front leg, the left rear leg, and the right middle leg. Similarly, the right tripod includes the right front leg, the right rear leg, and the left middle leg. During locomotion, the left tripod is synchronized and is 180° out of phase with the right tripod—therefore producing an alternating tripod gait (see FIGS. 2 and 3).

Preferably, computing system 16 is an onboard central processing unit used for computation and motor control, such as a 100 MHz INTEL 486 microprocessor. Computing system 16 is electrically coupled to input/output system 18 via known methods. A remote control unit, which transmits radio frequencies to an antenna 26 of robotic device 10 and is transferred to input/output system 18. The remote control unit may be used to control the speed and direction of robotic device 10. Although it is anticipated that robotic device 10 may be operated in a program mode to enable independent operation tailored to environmental conditions.

Onboard power source 22 provides power to computing system 16, input/output system 18, and drive actuators 34. Preferably, onboard power source 22 includes two sealed lead-acid batteries, each having a capacity of 2.2 Ah at 12 V. A power source of this capacity provides approximately 48 minutes of standby time and approximately 18 minutes of operational time. However, it should be understood that any power source that provides adequate power may be used, which may include but is not limited to solar power, gas power, and the like.

As best seen in FIGS. 1 and 2, each compliant leg 14 is mounted to power drive system 24 for rotation about a hip joint 28. Specifically, each compliant leg 14 possesses only one independently actuated revolute degree of freedom. Preferably, each compliant leg 14 provides compliance substantially in a direction opposite of an applied force. Each compliant leg 14 is generally C-shaped to provide compliance primarily in a direction opposite of the applied force. That is, during locomotion on a generally flat terrain, each compliant leg 14 provides compliance generally in the direction of the ground reaction forces. The specific direction of compliance is dependent upon the specific forces acting on compliant leg 14. Such forces are caused, at least in part, by the weight and inertia of robotic device 10, which may include both vertical and horizontal force components. It should be appreciated that each compliant leg 14 may include other shapes that provide compliance substantially in the radial direction.

Each compliant leg 14 is preferably made of 1 cm diameter DELRIN rods, a synthetic resinous plastic material, to provide passive compliance. Passive compliance generally is the ability to absorb some component of the applied force through the material properties of the leg. This force that is absorbed is stored within the leg and is later released as the leg begins pushing off the ground surface to provide efficient locomotion. Passive compliance is distinguished from active compliance as active compliance uses explicit actuation, such as through motors or actuators, to achieve compliance. It should be appreciated that each compliant leg 14 may be made from other materials that provide passive compliance, such as fiberglass.

Compliant legs 14 are oriented in a sprawling position to provide strong passive stability properties, even on broken terrain to minimize the potential for rollover. However, in the event robotic device 10 rolls over, rigid body 12 is designed to be symmetrical to permit continued locomotion in this inverted orientation. It is anticipated that rigid body 12 may have any shape that is particularly conducive to a known task and/or environment.

As seen in FIG. 1, each compliant leg 14 is coupled to an output gear shaft 30 of power drive system 24 for rotational movement therewith. Specifically, compliant leg 14 is coupled to output gear shaft 30 via a fastener 32. Each gear shaft 30 is coupled to an associated single drive actuator 34. It is important to understand that each compliant leg 14 requires only a single dedicated drive actuator 34 for operation. Preferably, each drive actuator 34 is a MAXON RE 118751 20 watt DC brushed motor with a MAXON 114473 two stage planetary gearhead having a output ratio of 33:1, which delivers an intermittent stall torque of 6 Nm.

Input/output system 18 selectively controls each drive actuator 34 in response to signals received from computing system 16. Each hip joint 28, gear shaft 30, and drive actuator 34 is fixed in position relative to rigid body 12, therefore additional drive actuators are not necessary. Compliance of each compliant leg 14 is primarily in these unactuated spherical degrees of freedom.

In order to provide clearance for the front and back compliant legs, the middle compliant legs are disposed further outboard relative to the front and back compliant legs (FIG. 1). This enables the front and back compliant legs to rotate without the risk of interfering with the middle compliant legs. It should be appreciated that this arrangement is only necessary if the length of the compliant legs is larger than the distance between adjacent compliant legs.

Sensing system 20 includes a plurality of sensors 36 for providing additional data to sensing system 20 and/or computing system 16. This plurality of sensors 36 may be used for gathering information relating to leg position, heat buildup, global position using the global positioning system, energy reserves, environmental conditions, etc.

Operation

Locomotion of robotic device 10 is controlled by computing system 16 as it drives each compliant leg 14 via power drive system 24. As described above, compliant legs 14 are arranged such that three are disposed on opposing sides of rigid body 12, thereby forming the left and right tripod pattern. Specifically, the left tripod includes the left front leg, the left rear leg, and the right middle leg. Similarly, the right tripod includes the right front leg, the right rear leg, and the left middle leg. Therefore, the left and right tripods each form a sturdy, reliable sprawling base support. During locomotion, the left tripod is synchronized and is 180° out of phase with the right tripod—therefore producing an alternating tripod gait (see FIG. 2).

Figure 3:
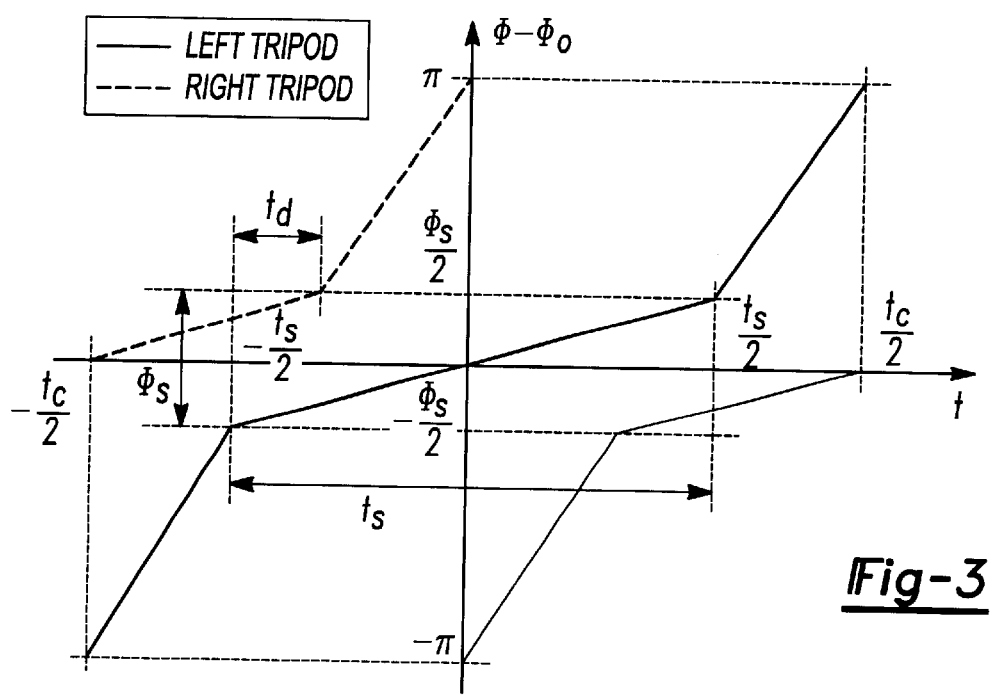
FIG. 3 is a motion profile for the left and right tripods of the mobile robot of the present invention.

More particularly, as seen in FIG. 3, the target trajectory of the left and right tripods, represented as a dashed line and a solid line, respectively, is a periodic function of time according to four variables: $t_c$, $t_s$, $\Phi_s$, and $\Phi_o$. In a single cycle, both tripods, and consequently each compliant leg 14, go through a slow swing phase $\Phi_s$, generally while in contact with the ground, and a fast swing phase $2\pi-\Phi_s$, generally while not in contact with the ground. The period of a complete rotation of a single compliant leg is $t_c$, while the duration of such slow swing movement is $t_s$. Similarly, the leg sweep angle for slow leg swing is $\Phi_s$ and the leg angle offset is $\Phi_o$. Accordingly, $t_c$ and $t_s$ represent the duty factor of each tripod. As seen in FIG. 3, there is a duration of time when all six legs are in contact with the ground, $t_d$. This duration is determined by the duty factor of both tripods. Finally, the $\Phi_o$ parameter offsets the motion profile with respect to the vertical. It is important to note that although both profiles are monotonically increasing in time, these profiles may be reversed to enable backward locomotion.

In order to turn robotic device 10 in place, compliant legs 14 on opposing sides of robotic device 10 operate in opposite directions. That is, three compliant legs 14 on one side of robotic device 10 change direction. The turning direction of robotic device 10 depends upon the rotational direction of the left and right tripod sets. However, each set of tripods is still synchronized internally in order to maintain at least three compliant legs 14 in contact with the ground at any one time to maintain stability. Similar to the control of the forward or backward locomotion speed, the rate of turning depends on the choice of the particular motion parameters, mainly $t_c$ and $\Phi_s$.

Dynamic locomotion with compliant legs permits not only higher speeds and the potential for drastically improved mobility compared to statically stable machines, but at the same time permits these improvements with greatly simplified leg mechanics. Prior art legged hexapods required the use of complex legs having at least three actuated degrees of freedom. These actuated degrees of freedom each required an individual actuator which contributed greatly to the mechanical complexity, unit weight, and cost of the robotic device. However, according to the principles of the present invention, a simplified legged hexapod is provided that requires only a single actuated revolute degree of freedom, thereby eliminating the need for the additional actuators. Minimizing energy losses in body movement is achieved through the use of compliant legs that permit the absorption of a portion of the ground reaction forces by the compliant legs.

When robotic device 10 turns upside-down, robotic device 10 continues operation after the $\Phi_o$ parameter is changed by 180°. This can be accomplished automatically via sensors 36 or accomplished manually via input from the operator (i.e. remote control).

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A mobile robot comprising:
   a body;
   at least six compliant legs each having an actuator, said compliant legs being mounted to said body for movement relative thereto, each of said compliant legs having a single actuated degree of freedom; and
   a controller operably coupled to said actuators, said controller selectively actuating said actuators to drive said compliants legs in an alternating tripod gait.

2. The mobile robot according to claim 1 wherein said compliant legs are passively compliant.

3. The mobile robot according to claim 2 wherein said passive compliance is substantially in a radial direction.

4. The mobile robot according to claim 2 wherein said compliant legs are each generally C-shaped, said C-shape legs providing compliance substantially in a radial direction.

5. The mobile robot according to claim 1 wherein said actuators drive said compliant legs in a solely rotational direction.

6. The mobile robot according to claim 1 wherein said body is symmetrical about a horizontal plane so as to permit mobility when the mobile robot is in an upside-down orientation.

7. The mobile robot according to claim 1, further comprising:
   a power unit for supplying power to said actuators and said controller, said power unit being mounted on said body.

8. The mobile robot according to claim 1 wherein each of said actuators comprises:
   a motor coupled to said controller; and
   a planetary gear set enmeshing said motor and driving said corresponding compliant leg.

9. A mobile robot comprising:
   a rigid body being symmetrical about a horizontal plane to permit the mobile robot to travel in an inverted position;
   at least six legs rotatably coupled to said rigid body, each of said legs being made of a resilient material so as to absorb at least a portion of the forces exerted on said rigid body during movement;
   at least six actuators individually driving each of said legs; and
   a controller selectively actuating said actuators to drive said legs in an alternating tripod gait.

10. The mobile robot according to claim 9 wherein said legs are each compliant substantially in a radial direction.

11. A mobile robot comprising:
    a rigid body;
    at least six legs rotatably coupled to said rigid body, each of said legs being made of a resilient material so as to absorb at least a portion of the forces exerted on said rigid body during movement, said legs are each generally C-shaped, said C-shape legs providing compliance in response to ground reaction forces;
    at least six actuators individually driving each of said legs; and
    a controller selectively actuating said actuators to drive said legs in an alternating tripod gait.

12. A mobile robot comprising:
    a rigid body;
    at least six legs rotatably coupled to said rigid body, each of said legs being made of a resilient material so as to absorb at least a portion of the forces exerted on said rigid body during movement;
    at least six actuators individually driving each of said legs, said actuators drive said legs in a solely rotational direction; and
    a controller selectively actuating said actuators to drive said legs in an alternating tripod gait.

13. The mobile robot according to claim 14, further comprising:
    a power unit for supplying power to said actuators and said controller, said power unit being mounted on said rigid body.

14. A mobile robot comprising:
    a rigid body;
    at least six legs rotatably coupled to said rigid body, each of said legs being made of a resilient material so as to absorb at least a portion of the forces exerted on said rigid body during movement;
    at least six actuators individually driving each of said legs, each of said actuators comprising:
       a motor coupled to said controller; and
       a gear set enmeshing said motor and driving said corresponding leg; and
    a controller selectively actuating said actuators to drive said legs in an alternating tripod gait.

15. A robot comprising:
    a rigid body;
    a drive system operably coupled to said rigid body, said drive system having at least six drive members;
    at least six compliant legs independently coupled to said drive members of said power drive system, each of said at least six compliant legs being rotatable in a plane generally parallel to a sagittal plane, each of said at least six compliant legs absorbing at least a portion of the forces exerted on said rigid body;
    a controller operably coupled to each of said at least six drive members, said controller selectively driving said at least six compliant legs in an alternating tripod gait; and
    an onboard power source supplying power to said drive system and said controller.

16. The robot according to claim 15 wherein said compliant legs are passively compliant.

17. The robot according to claim 15 wherein said compliant legs provide compliance substantially in a radial direction.

18. The robot according to claim 15 wherein said body is symmetrical about a horizontal plane so as to permit mobility when the mobile robot is in an upside-down orientation.

19. The robot according to claim 15 wherein each of said drive members comprises:

a motor coupled to said controller; and a gear set enmeshing said motor and driving said corresponding compliant leg.

* * * * *